United States Patent
Van Der Waals et al.

(10) Patent No.: US 6,881,817 B2
(45) Date of Patent: Apr. 19, 2005

(54) ADHESIVE COMPOSITION WITH INCREASED CURE RATE

(75) Inventors: Adriaan Cornelis Lambertus Maria Van Der Waals, Heerlen (NL); Gerard Evert Oosting, Geleen (NL); Jozef Maria Johannes Mattheij, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/222,963

(22) Filed: Aug. 19, 2002

(65) Prior Publication Data

US 2003/0065127 A1 Apr. 3, 2003

Related U.S. Application Data

(63) Continuation of application No. PCT/NL01/00092, filed on Feb. 5, 2001.

(30) Foreign Application Priority Data

Feb. 18, 2000 (NL) .............................. 1014433

(51) Int. Cl.$^7$ .................... C08G 12/32; C08G 14/04
(52) U.S. Cl. .................... 528/230; 528/243; 528/254; 528/256; 428/502; 428/566; 427/372.2; 427/374.2; 427/369

(58) Field of Search ................... 528/230, 243, 528/254, 256; 428/502, 506; 427/372.2, 374.2, 369

(56) References Cited

U.S. PATENT DOCUMENTS 4,997,905 A * 3/1991 Druet et al. ............... 528/230

OTHER PUBLICATIONS

English Abstract of EP 0 436 485.
English Abstract of EP 0 001 596.
English Abstract of CH 188327.

* cited by examiner

Primary Examiner—Duc Truong
(74) Attorney, Agent, or Firm—Mayer, Brown, Rowe & Maw LLP

(57) ABSTRACT

Adhesive composition consisting of an aminoplast resin with a free formaldehyde-like compound being present. In particular an adhesive composition consisting of a melamine-urea-formaldehyde resin to which a free formaldehyde-like compound has been added so that $F/(NH_2)_2$ is equal to 0.8–1.6. The adhesive is in particular suitable for the preparation of board material by combining in a press cellulose-containing materials with the adhesive according to the invention and in this press manufacturing board material at elevated temperature and pressure.

14 Claims, No Drawings

ADHESIVE COMPOSITION WITH INCREASED CURE RATE

CROSS REFERENCE TO RELATED APPLICATIONS

This application is a continuation of International Application No. PCT/NL01/00092, filed Feb. 5, 2001, and which further claims priority from Dutch Application No. 1014433, filed Feb. 18, 2000. These applications, in their entirety, are incorporated herein by reference.

The invention relates to an adhesive composition on the basis of a formaldehyde-containing aminoplast resin with an increased cure speed and a method for the preparation thereof. Further the invention relates to a method for the preparation of board material with application of the adhesive composition obtained.

An adhesive composition on the basis of a formaldehyde-containing aminoplast resin with an increased cure speed and a method for the preparation thereof is known from EP-A-436485. In this patent publication a method is described for accelerated curing of aminoplast adhesives and wood-based materials manufactured with application thereof. For the accelerated curing of aminoplast adhesives an accelerator-catcher system is used, wherein a urea-formaldehyde mixture as an accelerator and a formaldehyde scavenger are added to the adhesive. The addition of a formaldehyde scavenger prevents increasing of the formaldehyde emission. As formaldehyde scavenger urea is used in EP-A-436485. In the urea formaldehyde accelerator the molar ratio urea: formaldehyde lies between 1:3 and 1:6. The quantity of accelerator used is 0.1–5 wt. % relative to the quantity of adhesive. The quantity of formaldehyde scavenger can be up to 10 wt. % relative to the quantity of adhesive.

In practice, it is a disadvantage of subsequent addition of urea to bind formaldehyde that the method is unnecessarily complicated. Another disadvantage of the subsequent addition of urea is that the resin must be cured at a lower temperature to counter decomposition of urea and associated development of fumes during curing. The subsequent addition of urea also has an adverse effect on the resin stability.

It was found that the cure speed of an aminoplast adhesive can be increased considerably with an adhesive composition prepared from an aminoplast resin, with a free formaldehyde-like compound being also present and with the quantity of the free formaldehyde-like compound lying between 1 and 50 wt. % relative to the total quantity of formaldehyde added during the adhesive preparation. By 'formaldehyde-like compounds' are meant compounds which can react as formaldehyde. If formaldehyde is used as free formaldehyde-like compound, it is preferably used in a quantity of between 2 and 15 wt. % relative to the total quantity of formaldehyde added during the adhesive preparation.

It was found in particular that the cure speed of an adhesive can be increased considerably with an adhesive composition consisting of an aminoplast resin, with a free formaldehyde-like compound being also present and with the $F/(NH_2)_2$ ratio of the total adhesive composition lying between 0.8 and 1.6. The $F/(NH_2)_2$ ratio is the molar ratio of the formaldehyde equivalents and the $NH_2$ groups present.

The $F/(NH_2)_2$ ratio of the total adhesive composition is preferably 0.9–1.5.

As aminoplast resin are used in the present invention condensation products of an amino compound with a free formaldehyde-like compound.

As amino compound urea, melamine, melam, melem, ureidomelamine and mixtures of these compounds can be used. Preferably urea and/or melamine are used, more in particular a mixture of urea and melamine with a melamine/urea molar ratio varying between 0.01 and 2, in particular between 0.02 and 1.

As formaldehyde-like compounds can be used which can react as formaldehyde. Examples are formaldehyde and paraformaldehyde. Paraformaldehyde is the polymer or oligomer form of formaldehyde which splits off formaldehyde at depolymerization. Paraformaldehyde with a degree of polymerization degree of n can generate n molecules of formaldehyde and thus n formaldehyde equivalents.

Surprisingly it was found that despite the addition of a formaldehyde-like compound during the adhesive preparation, the formaldehyde-emission of the ultimately manufactured board material remains within the internationally applicable standards.

The invention also relates to a method for the preparation of an aminoplast adhesive with an increased cure speed by:
reacting an amino compound with a formaldehyde-like compound to form a resin, which resin is converted into an aminoplast adhesive by addition of a formaldehyde-like compound and a catalyst until an $F/(NH_2)_2$ ratio of 0.8–1.6 is obtained.

Catalysts which together with the resin form the adhesive are metal salts, preferably salts of sodium, potassium, ammonium, aluminium, magnesium and zinc. Examples of suitable salts are sodium nitrate, aluminium sulphate, ammonium hydrogenphosphate, ammonium persulphate, ammonium chloride, ammonium sulphate and ammonium nitrate. Preferably ammonium salts are used and in particular ammonium chloride or ammonium sulphate.

The invention furthermore relates to the manufacture of board material by combining cellulose-containing materials with an adhesive in a press and in this press process these to board material at an elevated temperature and pressure, using as adhesive an adhesive composition consisting of an aminoplast resin, with a free formaldehyde-like compound being also present so that the $F/(NH_2)_2$ ratio of the total adhesive composition is equal to 0.8–1.6.

Preferably the method is used in the production of multiplex, particle board, MDF board (medium-density fibreboard), HDF board (high-density fibre board) or OSB board (oriented-strand board).

Preparing the adhesive according to the invention by adding to the resin a formaldehyde-like compound and a catalyst takes place shortly before the board production. The order in which the two components are added to the resin is not critical. The catalyst and the formaldehyde-like compound can also be added at the same time to the resin. The resin has at room temperature sufficient stability to be able to be stored for a few days. After addition of the formaldehyde-like compound and the catalyst the adhesive is used for 10 seconds to 1 hour for the preparation of board material, preferably for 30 seconds to 30 minutes.

The pressing conditions during the preparation of board material depend on the kind of board material. Thus, for the production of multiplex a pressure of 1–2 MPa is applied, for particle board a pressure of 1–5 MPa, preferably 2–4 MPa, and for MDF a pressure of 2–7 MPa, preferably 3–6 MPa. The temperature at which the board material is manufactured is generally 100–140° C. in the case of multiplex, 180–230° C. for particle board and OSB and 170–230° C. for MDF. In the case of multiplex the board is kept under said conditions for 5–10 minutes (pressing time). For particle board, MDF and OSB a pressing time is applied which is expressed in seconds per mm board thickness. For OSB board the pressing time is 4–12 sec/mm, preferably 6–10 sec/mm. For particle board a pressing time of 4–12 sec/mm, preferably 5–10 sec/mm is generally adopted. MDF boards are manufactured with a pressing time of 5–17 sec/mm, in particular 8–14 sec/mm.

It was found that an increase in cure speed up to 40% was obtained.

During the adhesive preparation waxes are generally added to the adhesive composition to make the final board material more resistant to moisture absorption. The waxes are generally emulsion waxes or solid waxes and originate for example from the petroleum industry.

The invention will be elucidated further by means of the following examples.

EXAMPLE I 269.2 grams of a urea-formaldehyde precondensate with a formaldehyde/urea F/U molar ratio of 5.0 and a solid content of 80% was introduced into a reactor at room temperature, after which 99.6 grams of water was added. The temperature was increased to 65° C., after which the solution was neutralized with 2 N NaOH until a pH of 7.3 was reached. Afterwards 91.5 grams of urea was added, so that a formaldehyde/urea (F/U) molar ratio of 2.0 was obtained. In the course of 10 minutes the temperature was gradually raised from 65° C. to 100° C., after which methylolation was carried out for 5 minutes. Then 2 N acetic acid was added until a pH of 5.5 was reached. The mixture obtained was condensed at 100° C. until a viscosity of 450 MPa.s was obtained. 2.5 ml 2N NaOH was added to obtain a pH 8. Then the temperature was lowered to 90° C., followed by the addition of 240 grams of melaniinc (m) and subsequently 166 grams of formalin (50 wt % formaldehyde in water) was added to a $F/(NH_2)_2$ of 1.452. Hereafter the condensation reaction was carried out for 58 minutes, with every 10 minutes 1 ml 2 N NaOH being added. Subsequently the resin mixture obtained was cooled to 25° C. When a temperature of 60° C. had been reached the addition of 120 grains of urea was started, 1,000 grams of melamine-urea-formaldehyde (MUF) resin being ultimately obtained with an $F/(NH_2)_2$ of 1.06. This MUF resin was converted into MUF adhesive by addition of 2 mol % of ammonium sulphate solution (20 wt. % in water) and 18 grams of formalin (50 wt. % formaldehyde in water), resulting ultimately in an $F/(NH_2)_2$ of 1.10. The adhesive obtained contained 24 wt. % melamine and 27 wt. % urea.

The gel time of the resulting MUF adhesive was measured. This gel time is a measure of the cure speed of the adhesive.

The gel time is measured as follows. The resin is diluted with water to a solid content of 50%, after which the catalyst is added at room temperature. 5 grams of the mixture of resin and catalyst is put in a test tube, which is then placed in a water bath with a temperature of 100° C. The gel time is the time that has expired between the introduction of the test tube into the water bath and the occurrence of a gel in the tube. The end point of the reaction is unambiguous and reproducible.

In table 1 the quantity of applied melamine in the adhesive, the $F/(NH_2)_2$ ratio before and after the addition of the formaldehyde-like compound (FH), the quantity of catalyst and the gel time are stated.

EXAMPLES II–XVII

Analogously to example I adhesive compositions were prepared and gel times were measured, the quantity of melamine being varied as well as the quantities of extra formaldehyde added to the resin and the quantities of catalyst. In table 1 the compositions together with the measured gel times are shown.

Comparative Examples IA–XVIIA

Analogously to example I an adhesive composition was prepared by adding to the resin a catalyst, but without extra formaldehyde being added to the resin during the adhesive preparation. The compositions and gel times are also shown in table 1.

TABLE 1

| Example | Melamine wt. % | $F/(NH_2)_2$ ratio before F addition | $F/(NH_2)_2$ ratio after F addition | Catalyst in mol. % | Gel time in seconds |
|---|---|---|---|---|---|
| IA | 24 | 1.10 | — | 2.0 | 78 |
| I | 24 | 1.06 | 1.10 | 2.0 | 70 |
| IIA | 24 | 1.10 | — | 2.0 | 81 |
| II | 24 | 1.00 | 1.10 | 2.0 | 70 |
| IIIA | 24 | 1.10 | — | 3.0 | 74 |
| III | 24 | 1.00 | 1.10 | 3.0 | 62 |
| IVA | 24 | 1.10 | — | 5.0 | 70 |
| IV | 24 | 1.00 | 1.10 | 5.0 | 60 |
| VA | 24 | 1.10 | — | 2.0 | 80 |
| V | 24 | 0.90 | 1.10 | 2.0 | 67 |
| VIA | 24 | 1.10 | — | 3.0 | 73 |
| VI | 24 | 0.90 | 1.10 | 3.0 | 60 |
| VIIA | 24 | 1.10 | — | 5.0 | 70 |
| VII | 24 | 0.90 | 1.10 | 5.0 | 57 |
| VIIIA | 24 | 1.10 | — | 3.0 | 72 |
| VIII | 24 | 1.06 | 1.10 | 3.0 | 65 |
| IXA | 24 | 1.10 | — | 5.0 | 69 |
| IX | 24 | 1.06 | 1.10 | 5.0 | 62 |
| XA | 24 | 1.20 | — | 2.0 | 74 |
| X | 24 | 1.10 | 1.20 | 2.0 | 66 |
| XIA | 24 | 1.20 | — | 3.0 | 69 |
| XI | 24 | 1.10 | 1.20 | 3.0 | 58 |
| XIIA | 24 | 1.20 | — | 5.0 | 64 |
| XII | 24 | 1.10 | 1.20 | 5.0 | 53 |
| XIIIA | 24 | 1.00 | — | 2.0 | 94 |
| XIII | 24 | 0.90 | 1.00 | 2.0 | 82 |
| XIVA | 24 | 1.00 | — | 3.0 | 86 |
| XIV | 24 | 0.90 | 1.00 | 3.0 | 73 |
| XVA | 24 | 1.00 | — | 5.0 | 83 |
| XV | 24 | 0.90 | 1.00 | 5.0 | 71 |
| XVIA | 12 | 1.10 | — | 3 | 98 |
| XVI | 12 | 1.00 | 1.10 | 3 | 72 |
| XVIIA | 0 | 1.12 | — | 2 | 79 |
| XVII | 0 | 1.08 | 1.12 | 2 | 47 |

What is claimed is:

1. Adhesive composition prepared from, a formaldehyde-containing aminoplast resin, wherein a free formaldehyde-like compound is present and the quantity of the free formaldehyde-like compound lies between 1 and 50 wt. % relative to the total quantity of formaldehyde added during the adhesive preparation.

2. Adhesive composition according to claim 1, wherein formaldehyde is used as free formaldehyde-like compound, in a quantity of between 2 and 15 wt. % relative to the total quantity of formaldehyde added during the adhesive preparation.

3. Adhesive composition according to claim 1, wherein a free formaldehyde-like compound is present so that the $F/(NH_2)_2$ of the total adhesive composition is equal to 0.8–1.6.

4. Adhesive composition according to claim 3, wherein the $F/(NH_2)_2$ ratio of the adhesive composition is 0.9–1.5.

5. Adhesive composition according to claim 1, wherein a mixture of urea and melamine is used as amino compound in the aminoplast resin.

6. Adhesive composition according to claim 5, wherein the melamine/urea molar ratio is 0.01–2.

7. Method for the preparation of an aminoplast adhesive with an increased cure rate by reacting an amino compound with a formaldehyde-like compound to form a resin, wherein the resin is converted into an aminoplast adhesive by addition of a formaldehyde-like compound and a catalyst until an $F/(NH_2)_2$ ratio of 0.8–1.6 is achieved.

8. Method for the preparation of board material by combining cellulose-containing materials and an adhesive in a press and, in this press, processing these to board material at an elevated temperature and pressure, wherein, as adhesive an adhesive composition is used consisting of an aminoplast resin, a free formaldehyde-like compound being also present and the $F/(NH_2)_2$ ratio of the total adhesive composition being equal to 0.8–1.6.

9. Method for preparing board material comprising
adding to a resin formed by reacting an amino compound with a formaldehyde-like compound a catalyst and a formaldehyde-like compound to thereby form an aminoplast adhesive wherein the quantity of free formaldehyde-like compound in the adhesive is between 1 and 50 wt % relative to the total quantity of formaldehyde added;
combining the aminoplast adhesive with cellulose-containing material to form a curable mixture; and
curing the curable mixture under pressure to form a board material.

10. Method for preparing board material comprising
adding to a resin formed by reacting an amino compound with a formaldehyde-like compound a catalyst and a formaldehyde-like compound until an $F/(NH_2)_2$ ratio of 0.8–1.6 is achieved to thereby form an aminoplast adhesive containing free formaldehyde-like compound;
combining the aminoplast adhesive with cellulose-containing material to form a curable mixture; and
curing the curable mixture under pressure to form a board material.

11. Method according to claim 9, wherein the formaldehyde-like compound comprises formaldehyde or paraformaldehyde.

12. Method according to claim 9 for preparing multiples board material, wherein the curable mixture is cured under a pressure of 1–2 MPa at a temperature of from 100 to 140° C.

13. Method according to claim 9 for preparing particle board material, wherein the curable mixture is cured under a pressure of 1–5 MPa and a temperature of from 180–230° C.

14. Method according to claim 9 for preparing medium density fiber board material, wherein the curable mixture is cured under a pressure of 2–7 MPa and a temperature of from 170–230° C.

* * * * *